United States Patent [19]
Ueki

[11] Patent Number: 6,021,054
[45] Date of Patent: Feb. 1, 2000

[54] SMOOTHING CIRCUIT FOR SWITCHING POWER SUPPLY FOR REDUCTION OF NOISE

[75] Inventor: Kouichi Ueki, Saitama, Japan

[73] Assignee: Fuji Electric Co., Ltd., Kawasaki, Japan

[21] Appl. No.: 09/175,776

[22] Filed: Oct. 20, 1998

[30] Foreign Application Priority Data

Oct. 27, 1997 [JP] Japan ................................. 9-293718
Nov. 28, 1997 [JP] Japan ................................. 9-327509

[51] Int. Cl.$^7$ ....................................................... H02M 1/14

[52] U.S. Cl. ............................ 363/47; 363/48; 323/907; 323/356

[58] Field of Search ........................................ 323/369, 370, 323/907, 356, 222; 363/45, 46, 47, 48

[56] References Cited

U.S. PATENT DOCUMENTS

| | | | |
|---|---|---|---|
| 3,849,677 | 11/1974 | Stacey et al. | 327/552 |
| 4,247,888 | 1/1981 | Angquist | 363/47 |
| 4,302,716 | 11/1981 | Glavitsch et al. | 323/217 |

*Primary Examiner*—Shawn Riley
*Attorney, Agent, or Firm*—Kanesaka & Takeuchi

[57] ABSTRACT

In a smoothing circuit for a switching power supply having a reactor and a capacitor, the circuit includes a resistor connected in series to the capacitor, a MOSFET connected parallel to the resistor, and a control circuit for turning the MOSFET on only when the voltage at both ends of the resistor increases or decreases to reach reference voltages. Thus, the output waveform is changed from a triangular wave to a sine wave in order to reduce the harmonic components contained in the output ripple. An output noise is reduced stably without reducing efficiency.

14 Claims, 5 Drawing Sheets

SMOOTHING CIRCUIT FOR SWITCHING POWER SUPPLY FOR REDUCTION OF NOISE

BACKGROUND OF THE INVENTION AND RELATED ART STATEMENT

The present invention relates to a smoothing circuit for a switching power supply used to charge a battery and so on, which includes a combination of a reactor and a capacitor.

In a smoothing circuit for a switching power supply comprising a combination of a reactor and a capacitor, a higher switching frequency is used, and a film capacitor or a ceramic capacitor is used instead of an aluminum electrolytic capacitor in order to increase the life expectancy and reduce the size. FIG. 10 is a connection diagram showing an embodiment of a DC-DC converter section of a conventional switching power supply. In this figure, 1 is a transformer; 2 is a switching element; 3 and 4 are diodes; 5 is a reactor; 6 is a capacitor; and 7 is a resistor. A control circuit for driving the switching element 2 is omitted. When a film capacitor or a ceramic capacitor is used as the capacitor 6, the control system for the DC-DC converter section becomes unstable due to a small equivalent resistance of this capacitor. The resistor 7 having a small resistance value is connected in series to the capacitor in order to stabilize the control system.

FIG. 11 shows waveforms at the components in FIG. 10. A triangular ripple current with an inter-peak current $\Delta I$ such as that shown in FIG. 11 flows through the reactor 5 and capacitor 6 to generate at both ends of the resistor 7 (its resistance value is defined as $R_7$) a triangular ripple voltage with an inter-peak voltage $\Delta I \times R_7$, which constitutes an output ripple voltage.

Since the output ripple voltage is a triangular wave, it contains a relatively large amount of harmonic components with a relatively high frequency to create magnetic noise corresponding to an AM frequency in a cable connected to the output terminal of the switching power supply, thereby causing radio disturbance.

To eliminate this noise, an LC filter can be additionally connected to the output terminal. Though this can reduce a noise, however, it makes the operation of the control system for the DC-DC converter section unstable.

Also, a ripple attenuator module is commercially available for eliminating this noise. FIG. 12 shows the principle of the operation of a commercially available ripple attenuator module. In this figure, 40 and 41 are DC cut circuits; 42 and 45 are differential amplifiers; 43 is a MOSFET; and 44 is a reference voltage. Ripple noises from the DC cut circuits 40 and 41 are controlled by using the differential amplifier 42 and MOSFET 43, and a direct current is controlled by using the differential amplifier 45 and MOSFET 43 in such a way that the voltage $V_{DS}$ between a drain and a source of the MOSFET 43 becomes 0.36 V, thereby reducing the output noise. A loss corresponding to output current×0.36 V, however, unavoidably occurs, so the efficiency decreases by 10% or more if the output voltage is 3 V. In addition, if the output current is approximately 100 A, the loss will be 100 A×0.36 V=36 W, thereby requiring larger radiating fins. In addition, since a frequency of 1 MHz or greater can not be attenuated, in order to prevent an AM radio from being affected by radio disturbance caused by the noise generated from the output cable, the cable must be shielded.

In view of these problems, it is an object of this invention to provide an output noise reduction device that operates stably without reducing efficiency.

SUMMARY OF THE INVENTION

To achieve this object, the invention provides a smoothing circuit for a switching power supply including a combination of a reactor and a capacitor, wherein the circuit includes a resistor connected in series to the capacitor; a MOSFET connected parallel to the resistor at both ends thereof; and a circuit for turning the MOSFET on only when the voltage at both ends of the resistor exceeds a positive or negative reference voltage. Thus, the output wave form is changed from a triangular wave to a sine wave in order to reduce the harmonic components contained in the output ripple.

Also, in a smoothing circuit for a switching power supply including a combination of a reactor and a capacitor, the circuit includes a resistor connected in series to the capacitor; and shotkey diodes arranged reversely parallel to each other and connected to the resistor at both ends thereof. Thus, the output waveform is changed from a triangular wave to a sine wave in order to reduce the harmonic components contained in the output ripple.

Also, in a smoothing circuit for a switching power supply including a combination of a reactor and a capacitor, the circuit includes a resistor connected in series to the capacitor; and shotkey diodes arranged reversely parallel to each other and connected in series to the resistor. Thus, the output waveform is changed from a triangular wave to a sine wave in order to reduce the harmonic components contained in the output ripple.

Also, in a smoothing circuit for a switching power supply including a combination of a reactor and a capacitor, the circuit includes shotkey diodes arranged reversely parallel to each other and connected in series to the capacitor; and a MOSFET that is connected in series to the shotkey diodes and is turned on by an output voltage. Thus, the output waveform is changed from a triangular wave to a sine wave in order to reduce the harmonic components contained in the output ripple.

Also, in a smoothing circuit for a switching power supply including a combination of a reactor and a capacitor, the circuit includes a resistor connected in series to the capacitor; a plurality of MOSFETs, each connected parallel to the resistor at both ends thereof; and a plurality of circuits for turning the respective MOSFETs on only when the voltage at both ends of the resistor exceeds a positive or negative reference voltage. Thus, the output waveform is changed from a triangular wave to a sine wave in order to reduce the harmonic components contained in the output ripple.

Also, in a smoothing circuit for a switching power supply including a combination of a reactor and a capacitor, the circuit includes shotkey diodes arranged reversely parallel to each other and connected in series to the capacitor; and a heater that heats the shotkey diodes. This configuration restrains an increase in the harmonic components contained in the output ripple caused by an increase in the on-voltage of the shotkey diodes associated with a decrease in ambient temperature.

Also, a positive-temperature-coefficient thermistor is used as the heater to increase the amount of heat generated by the thermistor as the ambient temperature decreases, thereby improving the efficiency of the heater.

Also, in a smoothing circuit for a switching power supply including a combination of a reactor and a capacitor, the circuit includes shotkey diodes arranged reversely parallel to each other and connected in series to the capacitor; a MOSFET connected parallel to the shotkey diodes at both ends thereof; and a voltage-controlling circuit for controlling the MOSFET in such a way that the voltage at both ends of the shotkey diodes becomes constant. Thus, the effect of reducing the harmonic components contained in the output ripple is prevented from varying by the ambient temperature.

DETAILED DESCRIPTION OF PREFERRED EMBODIMENTS

Figure 1:
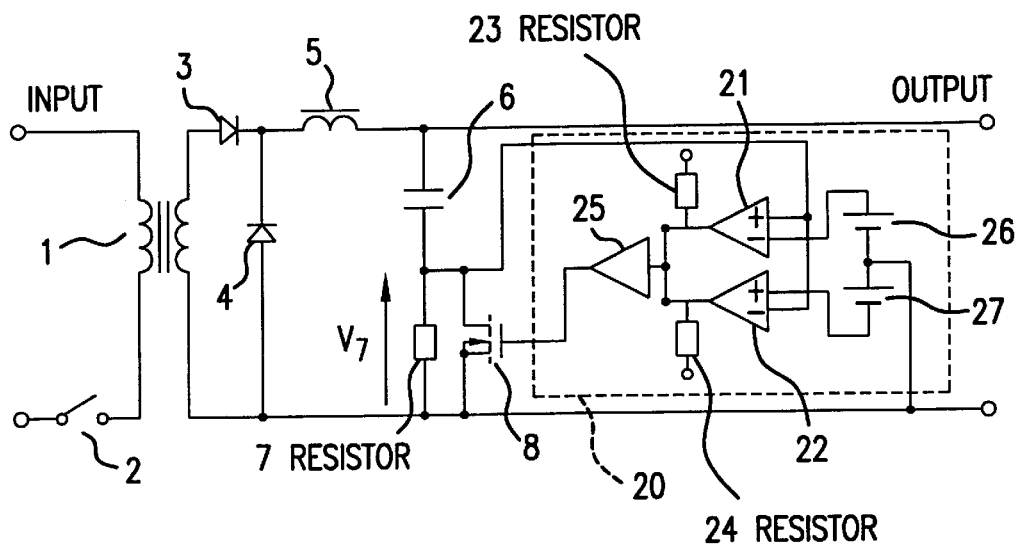
FIG. 1 is a connection diagram showing a first embodiment of this invention.
Figure 2:
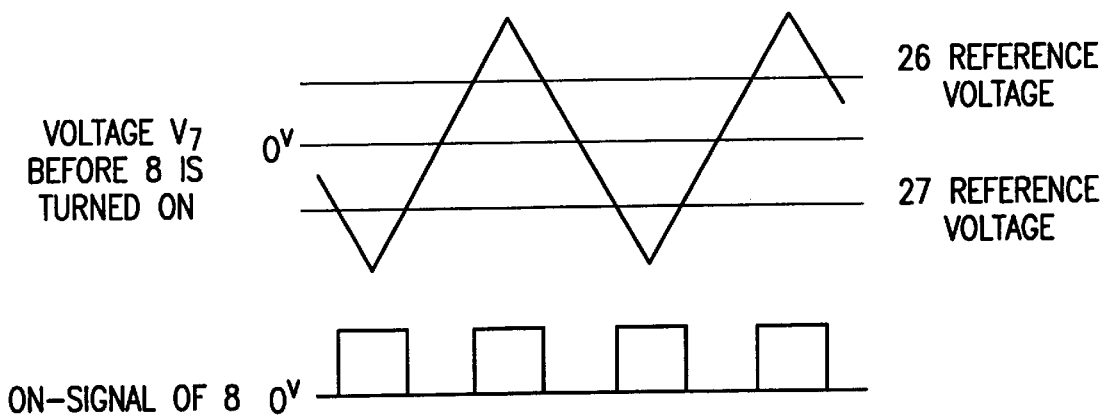
FIG. 2 is a time chart showing the operation of the circuit in FIG. 1.

FIG. 1 is a connection diagram showing a first embodiment of this invention. In this figure, 8 is a MOSFET; 20 is a control circuit; 21 and 22 are fast comparators; 23 and 24 are resistors; 25 is a buffer amplifier; and 26 and 27 are reference voltages. The other components are the same as those shown in FIG. 10 and have the same reference numerals. A control circuit for driving the switching element 2 is omitted. FIG. 2 is a time chart showing the operation of the circuit in FIG. 1.

The operation is described with reference to FIG. 2. The reference voltages 26 and 27 are set smaller than the peaks of the ripple voltage $V_7$ at both ends of the resistor 7. When the ripple voltage $V_7$ increases to reach the reference voltage 26, the fast comparator 21 is turned on to turn the MOSFET 8 on via the buffer amplifier 25, thereby connecting the on-resistance of the MOSFET 8 parallel to the resistor 7 to reduce the peak voltage of $V_7$. Likewise, when $V_7$ becomes the reference voltage 27, the fast comparator 22 is turned on to turn the MOSFET 8 on via the buffer amplifier 25, thereby connecting the on-resistance of the MOSFET 8 parallel to the resistor 7 to reduce the peak voltage of $V_7$. Thus, the waveform of the voltage $V_7$ during the on-period of the MOSFET 8 becomes similar to a sine wave. The voltage $V_7$ at both ends of the resistor 7, however, does not become similar to a sine wave unless the on-resistance of the MOSFET 8 is greater than the resistance value of the resistor 7, so if the on-resistance of the MOSFET 8 is smaller than the resistance value of the resistor 7, a resistor must be connected in series to the MOSFET 8 to raise its composite resistance value above the resistance value of the resistor 7.

This configuration enables the harmonic components contained in the output ripple voltage to be reduced by one-tenth or so.

Figure 3:
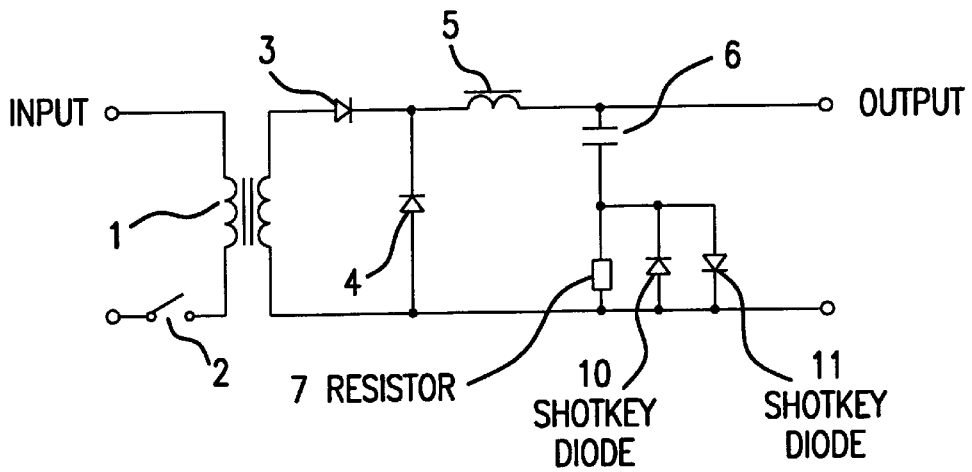
FIG. 3 is a connection diagram showing a second embodiment of this invention.

FIG. 3 is a connection diagram showing a second embodiment of this invention. In this figure, 10 and 11 are shotkey diodes. The other components are the same as those shown in FIG. 10 and have the same reference numerals. The shotkey diodes 10 and 11 having an on-voltage smaller than the peaks of the ripple voltage at both ends of the resistor 7 are connected reversely parallel to the resistor 7. Thus, when the shotkey diodes 10 and 11 are turned on, their on-resistances can be connected parallel to the resistor to reduce the peak voltages, thereby changing the waveform to a sine wave in order to reduce the harmonic components contained in the output ripple voltage.

Figure 4:
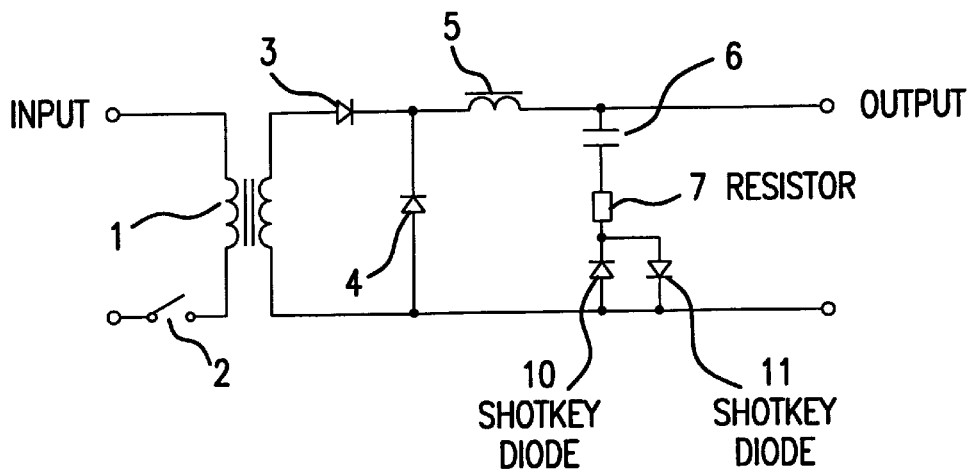
FIG. 4 is a connection diagram showing a third embodiment of this invention.

FIG. 4 is a connection diagram showing a third embodiment of this invention. In this figure, the shotkey diodes 10 and 11 connected reversely parallel to each other are, respectively, connected in series to the resistor 7. If the shotkey diodes 10 and 11 have small on-resistance and the control system for the DC-DC converter becomes unstable when they are connected parallel to the resistor 7, they can be connected in series to the resistor, as shown in FIG. 4, to avoid an unstable control system. The linearity of the on-resistance of the shotkey diodes 10 and 11 serves to reduce the peak voltages in order to change the waveform to a sine wave, thereby reducing the harmonic components contained in the output ripple voltage.

Figure 5:
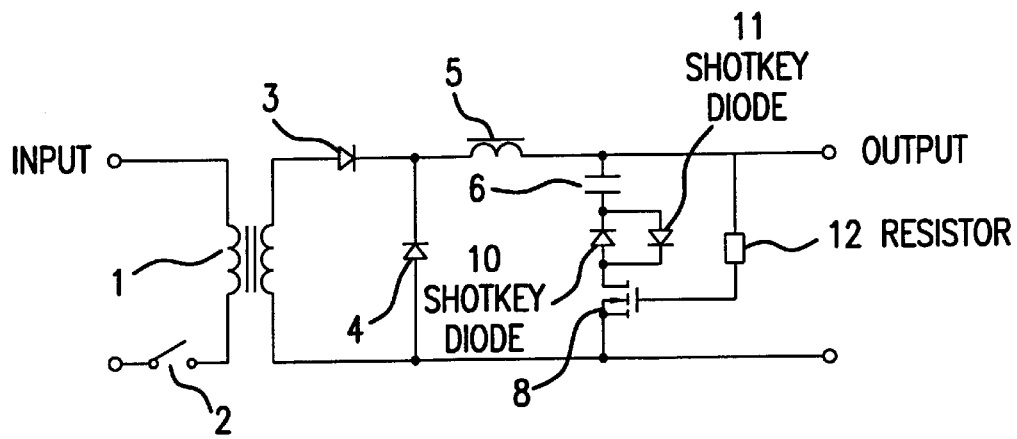
FIG. 5 is a connection diagram showing a fourth embodiment of this invention.

FIG. 5 is a connection diagram showing a fourth embodiment of this invention. In this figure, 8 is a MOSFET and 12 is a resistor. The other components are the same as those shown in FIG. 4 and have the same reference numerals. FIG. 5 differs from FIG. 4 in that instead of the resistor, the MOSFET 8 is connected in series to the capacitor 6. If an aluminum electrolytic capacitor with a large capacity is used as the capacitor 6, as an ambient temperature increases, the equivalent internal resistance of the aluminum electrolytic capacitor and the on-resistance of the shotkey diodes decrease. To compensate for this decrease, a MOSFET having an on-resistance that increases as the ambient temperature increases is used to stabilize the operation of the control system.

Figure 6:
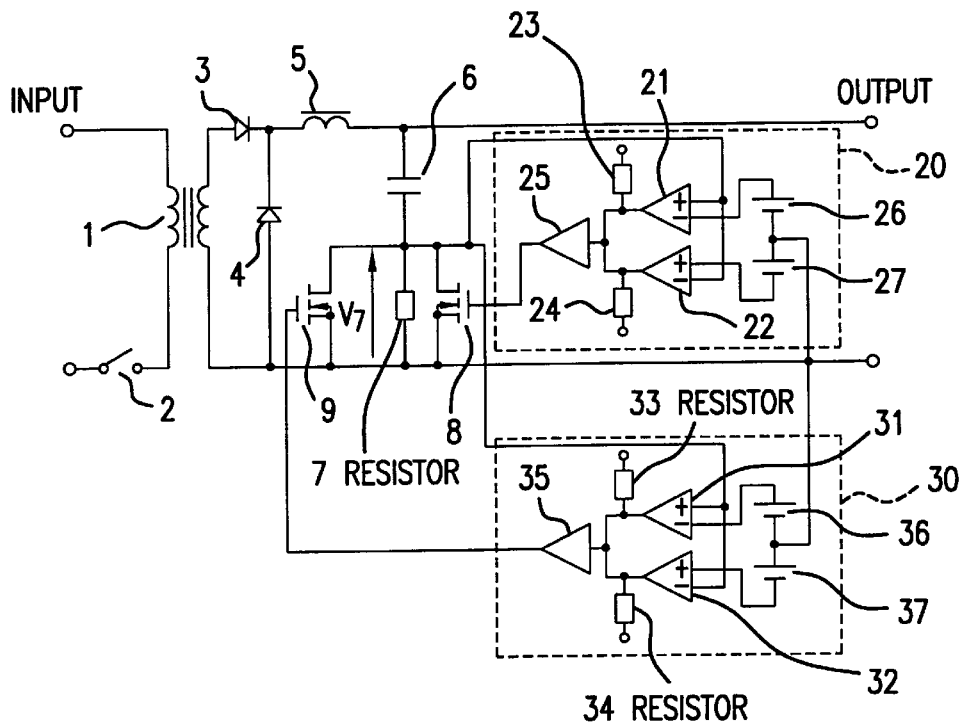
FIG. 6 is a connection diagram showing a fifth embodiment of this invention.
Figure 7:
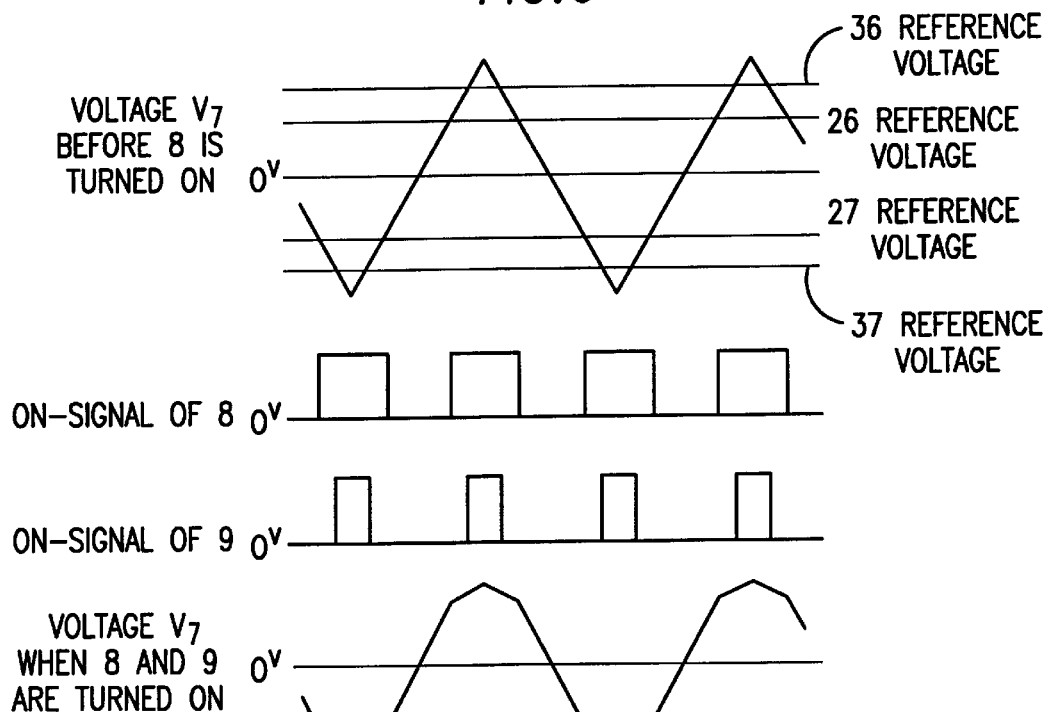
FIG. 7 is a time chart showing the operation of the circuit in FIG. 6.

FIG. 6 is a connection diagram showing a fifth embodiment of this invention. In this figure, 9 is a MOSFET; 30 is a control circuit; 31 and 32 are fast comparators; 33 and 34 are resistors: 35 is a buffer amplifier; and 36 and 37 are reference voltages. The other components are the same as those shown in FIG. 1 and have the same reference numerals. FIG. 6 differs from FIG. 1 in that two MOSFETs 8 and 9 and two control circuits 20 and 30 are connected to the resistor 7. FIG. 7 is a time chart showing the operation of the circuit in FIG. 6. The reference voltages 26, 27, 36 and 37 are set smaller than the peaks of the ripple voltage $V_7$ at both ends of the resistor 7. When the ripple voltage $V_7$ increases to reach the reference voltage 26 or decreases to reach the reference voltage 27, the MOSFET 8 is turned on. When the ripple voltage $V_7$ increases to reach the reference voltage 36 or decreases to reach the reference voltage 37, the MOSFET 9 is also turned on. Thus, the waveform of the voltage $V_7$ during the on-period of the MOSFETs 8 and 9 is changed to a sine wave, thereby restraining the harmonic components contained in the output ripple output.

Figures 8, 9, 10:
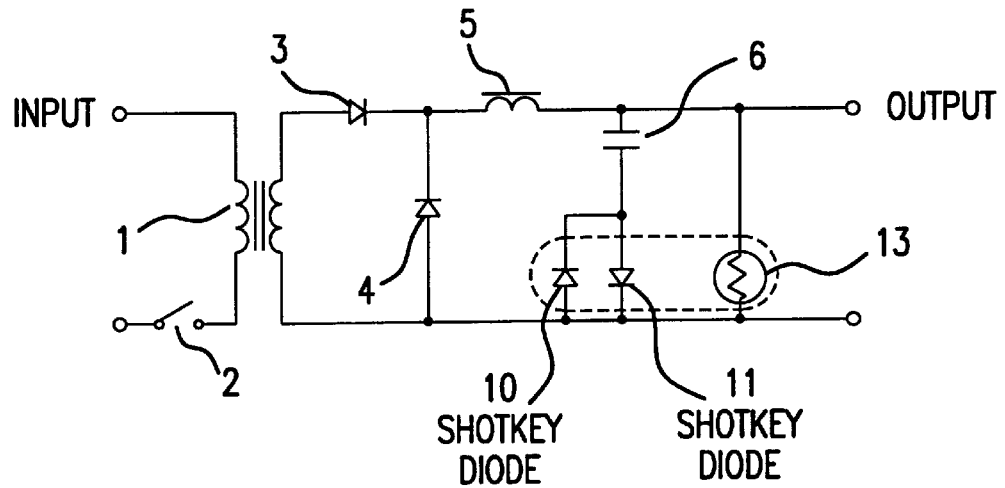
FIG. 8 is a connection diagram showing a sixth embodiment of this invention.
FIG. 9 is a connection diagram showing a seventh embodiment of this invention.
FIG. 10 is a connection diagram showing a conventional embodiment.
Figure 11:
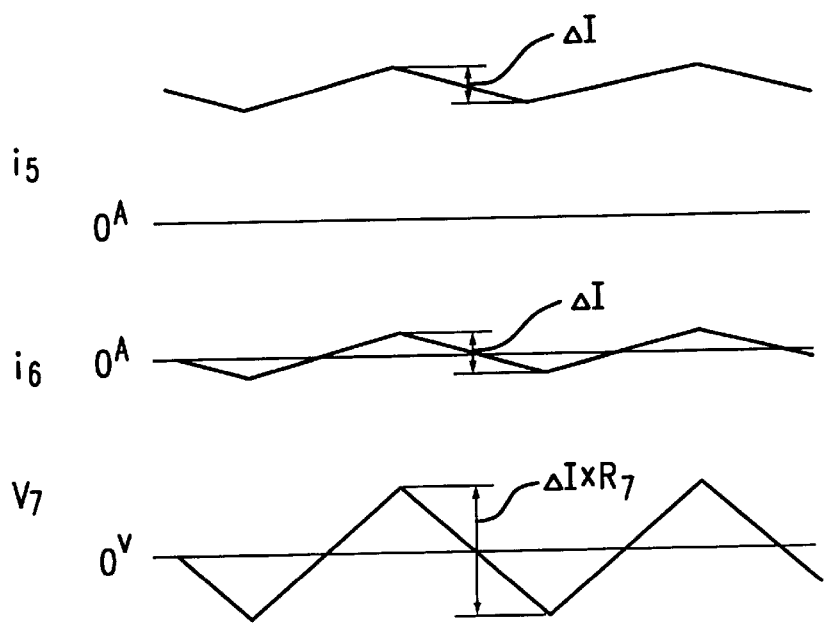
FIG. 11 shows waveforms from the components in FIG. 10.
Figure 12:
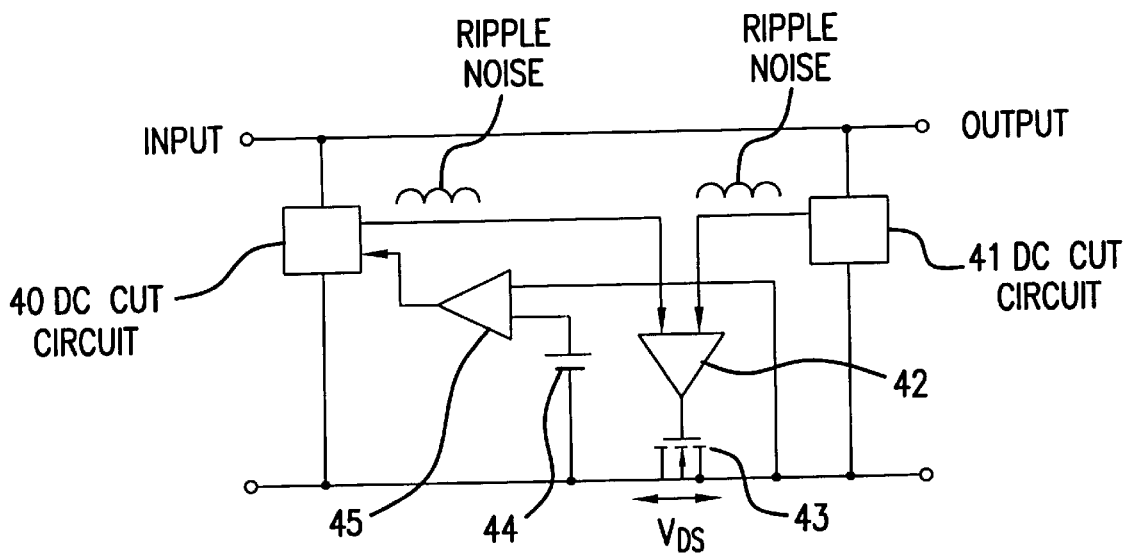
FIG. 12 shows the principle of the operation of a commercially available ripple attenuator module.

FIG. 8 is a connection diagram showing a sixth embodiment of this invention. In this figure, 13 is a positive-temperature-coefficient thermistor. The other components are the same as those shown in FIG. 4 and have the same reference numerals. The positive-temperature-coefficient thermistor 13 is located near the shotkey diodes 10 and 11 to heat them. When the ambient temperature decreases, on-voltages of the shotkey diodes 10 and 11 increase, so the output ripple voltage and thus the harmonic components contained therein increase. Since a positive-temperature-coefficient thermistor 13 is used, as a temperature decreases, the resistance value decreases as well to thereby increase the amount of heat, thereby efficiently restraining the increase in the on-voltages of the shotkey diodes 10 and 11.

FIG. 9 is a connection diagram showing a seventh embodiment of this invention. In this figure, 8 is a MOSFET and 14 is a voltage control circuit. The other components are the same as those shown in FIG. 8 and have the same reference numerals. The voltage control circuit 14 uses a voltage as the input and an on-off pulse signal as the output, and operates in such a way that the output on-period decreases as the input voltage increases. When the ambient temperature decreases to increase the on-voltage of the shotkey diodes 10 and 11, the output from the voltage control circuit 14 acts to reduce the on-period of the MOSFET 8, thereby reducing the ripple current diverted to the MOSFET 8. Thus, the ripple current flowing to the shotkey diodes 10 and 11 increases to increase the chip temperature of the shotkey diodes 10 and 11 while reducing the on-resistance.

Conversely, when the ambient temperature increases to reduce the on-voltage of the shotkey diodes 10 and 11, the output from the voltage control circuit 14 acts to increase the on-period of the MOSFET 8, thereby increasing the ripple current diverted to the MOSFET 8. Thus, the ripple current flowing to the shotkey diodes 10 and 11 decreases to reduce the chip temperatures of the shotkey diodes 10 and 11 while increasing the on-resistances. In this manner, the on-voltages of the shotkey diodes 10 and 11 can be maintained at an almost constant value regardless of changes in the ambient temperature.

This invention can reduce harmonic noise and reduce costs by one order or unit as compared to the commercially available ripple attenuator modules without causing the control of the DC-DC converter unstable or reducing efficiency. This invention also provides a circuit that is not affected by changes in the ambient temperature.

What is claimed is:

1. A smoothing circuit for a switching power supply comprising:

a reactor and a capacitor connected to the reactor, a resistor connected in series to the capacitor and having two ends, a first MOSFET situated parallel to the resistor and connected to the two ends of the resistor, and a first circuit connected to the first MOSFET for turning the first MOSFET on only when a voltage at the two ends of the resistor exceeds a predetermined first reference voltage range, said first MOSFET, when it is turned on, allowing a triangular ripple voltage which will be formed by the voltage exceeding the first reference voltage range to be changed to a wave form similar to a sine wave to thereby reduce harmonic components contained in the triangular ripple voltage.

2. A smoothing circuit according to claim 1, wherein said first circuit includes a buffer amplifier connected to the first MOSFET, two comparators connected to the buffer amplifier, and two reference voltage devices for providing two reference voltages to the comparators.

3. A smoothing circuit according to claim 1, further comprising a second MOSFET situated parallel to the resistor and connected to the two ends of the resistor, and a second circuit connected to the second MOSFET for turning the second MOSFET on only when the voltage at the two ends of the resistor exceeds a predetermined second reference voltage range different from the first reference voltage range.

4. A smoothing circuit according to claim 3, wherein each of said first and second circuit includes a buffer amplifier connected to each of the first and second MOSFETs, two comparators connected to the buffer amplifier, and two reference voltage devices for providing two reference voltages to the comparators.

5. A smoothing circuit for a switching power supply comprising:

a reactor and a capacitor connected to the reactor, a resistor connected in series to the capacitor and having two ends, and shotkey diodes arranged reversely parallel to each other and connected to the resistor.

6. A smoothing circuit according to claim 5, wherein said shotkey diodes are arranged parallel to the resistor and connected to the two ends of the resistor.

7. A smoothing circuit according to claim 5, wherein said shotkey diodes arranged reversely parallel to each other are connected to the resistor in series.

8. A smoothing circuit for a switching power supply comprising:

a reactor and a capacitor connected to the reactor, shotkey diodes arranged reversely parallel to each other and connected in series to capacitor, and a temperature compensating device situated near the shotkey diodes to properly actuate the shotkey diode regardless an ambient temperature.

9. A smoothing circuit according to claim 8, wherein said temperature compensating device is a MOSFET connected in series to the shotkey diodes, said MOSFET being turned on by an output voltage of the smoothing circuit.

10. A smoothing circuit according to claim 9, wherein said MOSFET has an on-resistance increasing as the ambient temperature increases.

11. A smoothing circuit according to claim 8, wherein said temperature compensating device is a heater for heating the shotkey diodes.

12. A smoothing circuit according to claim 11, wherein said heater is a positive-temperature-coefficient thermistor.

13. A smoothing circuit according to claim 8, wherein said temperature compensating device includes a MOSFET connected parallel to the shotkey diodes at two ends thereof, and a voltage control circuit connected to the MOSFET for controlling the MOSFET in such a way that a voltage at two ends of the shotkey diodes becomes constant.

14. A smoothing circuit according to claim 13, wherein said voltage control circuit controls the MOSFET such that when the ambient temperature decreases, an on-time of the MOSFET is reduced, and when the ambient temperature increases, the on-time of the MOSFET is increased.

* * * * *

UNITED STATES PATENT AND TRADEMARK OFFICE
CERTIFICATE OF CORRECTION

PATENT NO : 6,021,054

DATED : February 1, 2000

INVENTOR(S): Kouichi Ueki

It is certified that error appears in the above-identified patent and that said Letters Patent are hereby corrected as shown below:

In column 3, line 22, change "6." to --6;--;

In column 6, line 13, change "circuit" to --circuits--;

line 35, add --the-- before "capacitor"; and line 38, add --of-- after "regardless".

Signed and Sealed this

Fourteenth Day of November, 2000

Attest:

Q. TODD DICKINSON

*Attesting Officer*  *Director of Patents and Trademarks*